(12) United States Patent
Pentek et al.

(10) Patent No.: US 8,451,562 B2
(45) Date of Patent: May 28, 2013

(54) METHOD FOR MANUFACTURING A MAGNETIC WRITE HEAD HAVING A WRAP AROUND TRAILING MAGNETIC SHIELD WITH A TAPERED SIDE GAP

(75) Inventors: Aron Pentek, San Jose, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 328 days.

(21) Appl. No.: 12/766,769

(22) Filed: Apr. 23, 2010

(65) Prior Publication Data
US 2011/0262774 A1 Oct. 27, 2011

(51) Int. Cl.
*G11B 5/127* (2006.01)

(52) U.S. Cl.
USPC ............... 360/125.3; 360/119.03; 360/119.04

(58) Field of Classification Search
USPC ................ 360/119.01–119.04, 125.02, 125.3
See application file for complete search history.

(56) References Cited

U.S. PATENT DOCUMENTS

| | | | | |
|---|---|---|---|---|
| 4,935,832 A * | 6/1990 | Das et al. | | 360/112 |
| 5,075,956 A | 12/1991 | Das | | 29/603 |
| 7,248,431 B1 | 7/2007 | Liu et al. | | 360/120 |
| 7,392,577 B2 | 7/2008 | Yazawa et al. | | 29/603.12 |
| 7,715,152 B2 * | 5/2010 | Okada et al. | | 360/319 |
| 7,894,159 B2 * | 2/2011 | Lengsfield et al. | | 360/125.03 |
| 8,072,706 B2 * | 12/2011 | Hirata et al. | | 360/125.07 |
| 8,099,855 B2 * | 1/2012 | Le | | 29/603.16 |
| 8,169,741 B2 * | 5/2012 | Taguchi et al. | | 360/125.3 |
| 2005/0141137 A1 | 6/2005 | Okada et al. | | 360/122 |
| 2005/0280935 A1 * | 12/2005 | Clinton et al. | | 360/125 |
| 2008/0232001 A1 | 9/2008 | Bonhote et al. | | 369/319 |
| 2008/0259498 A1 | 10/2008 | Lengsfield et al. | | 360/235.4 |
| 2009/0067098 A1 | 3/2009 | Kim et al. | | 360/313 |
| 2009/0152119 A1 | 6/2009 | Tachibana et al. | | 205/127 |
| 2009/0154009 A1 | 6/2009 | Le | | 360/110 |
| 2009/0168236 A1 | 7/2009 | Jiang et al. | | 360/110 |
| 2009/0168257 A1 | 7/2009 | Hsiao et al. | | 360/319 |
| 2009/0168258 A1 | 7/2009 | Le et al. | | 360/319 |
| 2009/0268344 A1 | 10/2009 | Guan et al. | | 360/119.02 |

FOREIGN PATENT DOCUMENTS

JP 2009/146520 7/2009

* cited by examiner

*Primary Examiner* — Will J Klimowicz
(74) *Attorney, Agent, or Firm* — Zilka-Kotab, PC

(57) ABSTRACT

A magnetic write head having write pole and a wrap-around-trailing magnetic shield having side portions that are separated from the write pole by tapered non-magnetic side gap layers. The tapered non-magnetic side gap layers provide a non-magnetic side gap width that increases with increasing distance from the ABS, thereby providing optimal protection against adjacent track interference at the ABS while minimizing write field loss to the shield in regions away from the ABS.

6 Claims, 29 Drawing Sheets

METHOD FOR MANUFACTURING A MAGNETIC WRITE HEAD HAVING A WRAP AROUND TRAILING MAGNETIC SHIELD WITH A TAPERED SIDE GAP

FIELD OF THE INVENTION

The present invention relates to magnetic heads for data recording, and more particularly to a method for manufacturing a perpendicular magnetic write head having a wrap-around-trailing magnetic shield that tapers away from the write pole as it extends away from the air bearing surface so that portions of the shield that are further from the air bearing surface have a greater side gap spacing from the write pole than portions of the shield that are closer to the air bearing surface.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic recording system, it is desirable to maximize write field strength, maximize field gradient and minimize adjacent track interference. A strong write field ensures that a magnetic bit can be recorded in the magnetically hard top layer of the magnetic medium. A high field gradient allows for fast magnetic switching of the magnetic field from the write pole, thereby increasing the speed with which the magnetic transitions can be recorded. Reducing adjacent track interference increases the data density by allowing data tracks to be closer together, thereby increasing track density. One way to increase the field gradient is to provide a trailing magnetic shield. This magnetic trailing shield can also wrap around the sides of the write pole to provide side shielding to minimize adjacent track interference.

SUMMARY OF THE INVENTION

The present invention provides a magnetic write head that includes a magnetic write pole having a pole tip terminating at an air bearing surface, first and second laterally opposed sides and a trailing edge extending from the first side to the second side. The write head also includes a wrap-around-trailing magnetic shield having first and second side shield portions, and first and second non-magnetic side gap layers separating the first and second side portions of the wrap-around-trailing magnetic shield from the first and second sides of the write pole. Each of the first and second non-magnetic side gap portions has a thickness that increases with increasing distance from the air bearing surface.

The write head can be manufactured by a process that includes forming a write head, depositing a non-magnetic material such as alumina and then performing a first ion milling to form first and second inner side walls. A layer of non-magnetic metal such as Ru or Rh is then deposited and a second non-magnetic material such as alumina. A second ion milling can then be performed to form first and second outer side walls. A mask can then be formed that leaves a greater portion of the outer side walls exposed nearer to the ABS and a smaller portion of the outer side walls exposed further from the ABS. A reactive ion milling can then be performed to remove exposed portions of the first and second outer non-magnetic side walls.

The invention advantageously provides increased side gap spacing between the write pole and the shield to minimize the loss of write field to the shield, while minimizing side gap spacing at and near the ABS to prevent adjacent track interference.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
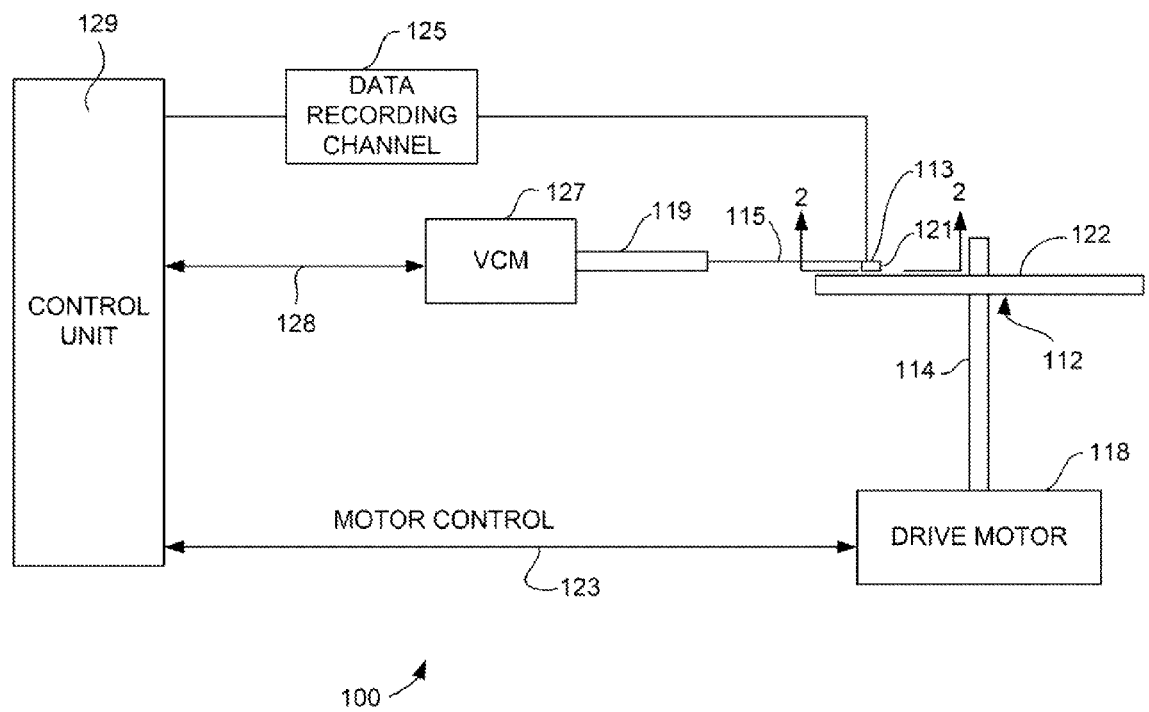
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
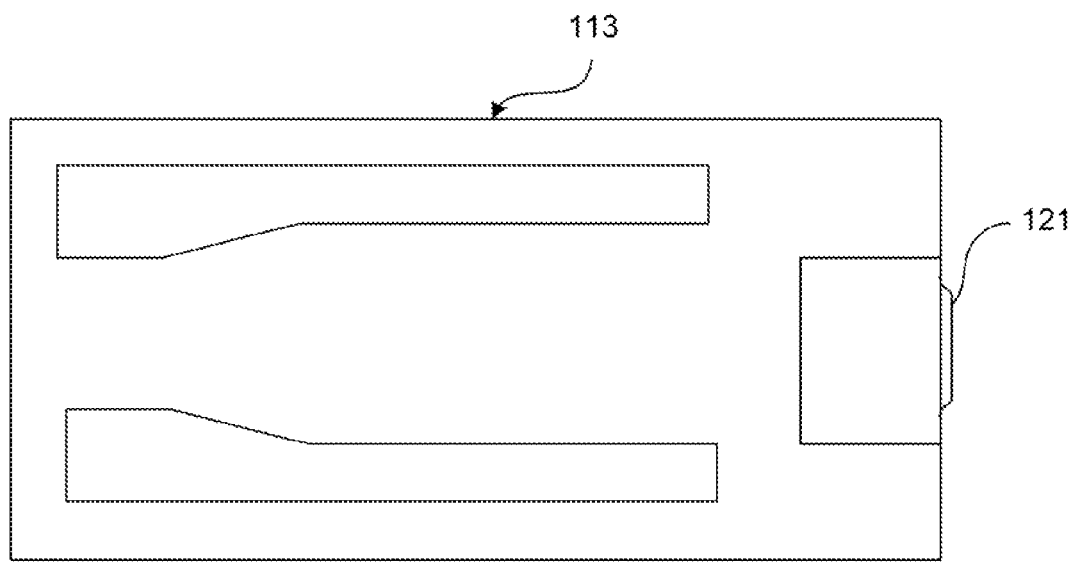
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
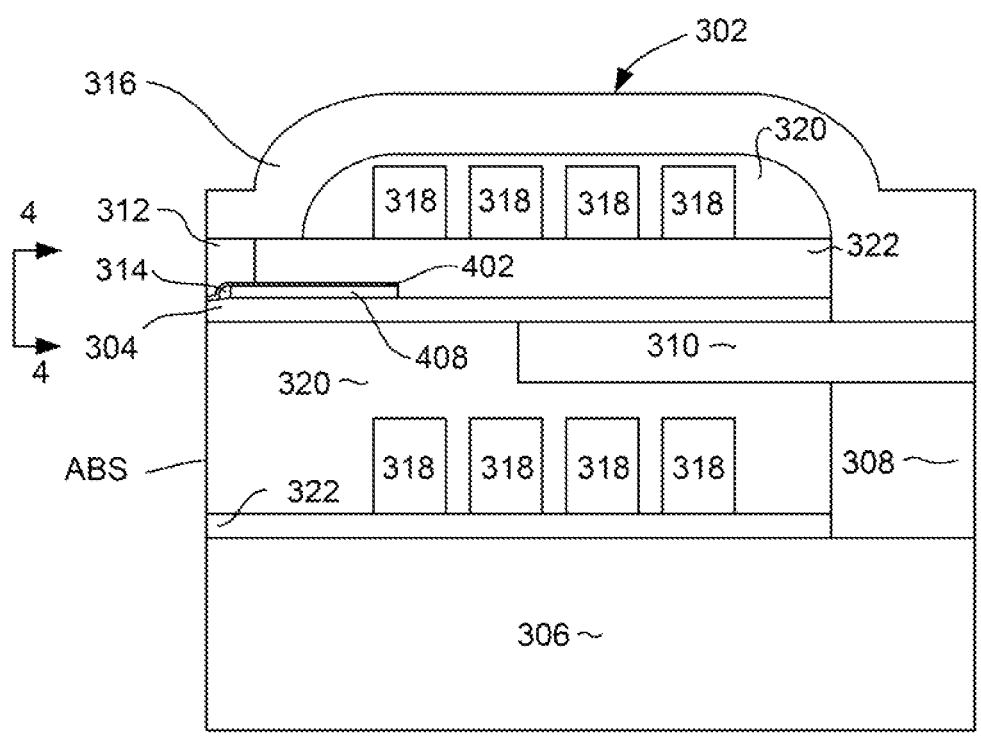
FIG. 3 is a cross sectional view of a magnetic write head according to an embodiment of the present invention.

With reference now to FIG. 3, the invention can be embodied in a magnetic head 302 having a tapered write pole and a non-magnetic bump. The magnetic write head 302 includes a magnetic write pole 304 and a magnetic return pole 306. A magnetic back gap layer 308 and magnetic shaping layer 310 magnetically connect the return pole 306 with the write pole 304 at a location removed from an air bearing surface (ABS).

An electrically conductive, non-magnetic write coil 318 passes between the write pole 304 and return pole 306 and may also pass above the write pole 304. The write coil 318 can sit on top of a non-magnetic, electrically insulating material 322 and is also embedded in a non-magnetic, electrically insulating material 320 such as alumina and or hard baked photoresist.

During operation, an electrical current flowing through the coil 318 induces a magnetic field that results in a magnetic flux flowing through the write pole 304. This causes a magnetic field to be emitted from the write pole 304 toward a magnetic medium such as the magnetic medium 122 shown in FIG. 1. This magnetic write field flows through the medium to return to the return pole 306 which has a sufficiently large cross section that it does not erase the magnetic bit written by the write pole 304.

In order to increase the write field gradient (and thereby increase switching speed), the write head 302 also includes a magnetic trailing shield 312. This trailing shield 312 is separated from the write pole 304 by a non-magnetic trailing gap layer 402. The write pole 312 may also be connected with a trailing return pole 316 that connects the trailing shield 312 with the hack portion of the write head 302, such as the back portion of the shaping layer 310.

A non-magnetic step layer 408 further disposed between the write gap layer 402 and the write pole 304 and recessed from the ABS increases the magnetic spacing between the write pole 304 and the trailing shield 312 in a location removed from the ABS. This helps to minimize the amount of write field lost to the trailing shield 312. A non-magnetic bump 314 may also be provided at the front edge of the non-magnetic step layer to further improve the magnetic spacing profile between the write pole 304 and the trailing magnetic shield 312. The construction of these structures 408, 314 will be better understood upon reading a method for manufacturing a write head as described below.

Figure 4:
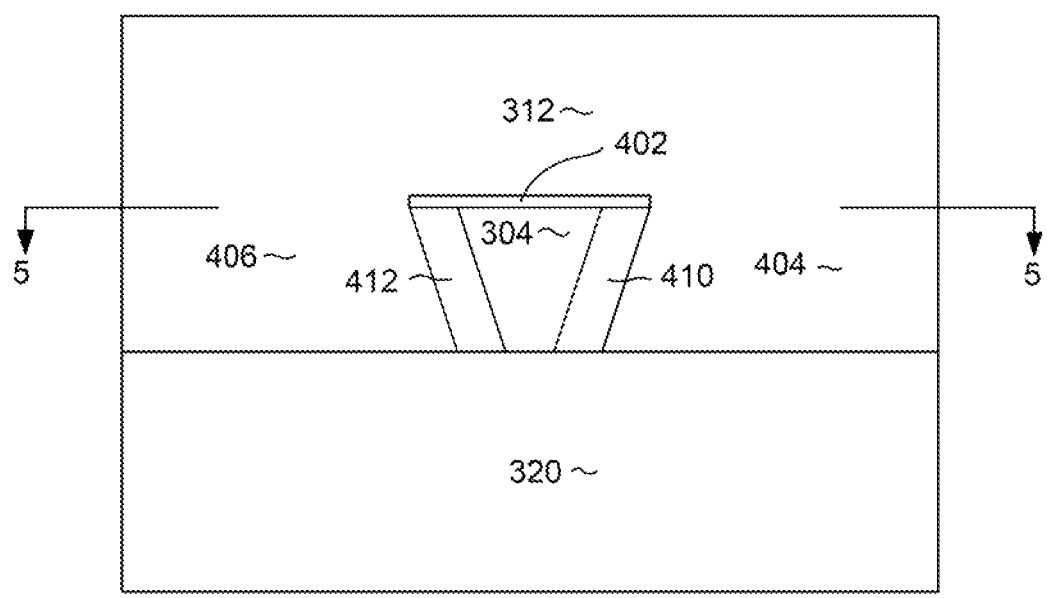
FIG. 4 is an enlarged ABS view as seen from line 4-4 of FIG. 3.

FIG. 4 shows an enlarged ABS view of a portion of the write head 302 as viewed from line 4-4 of FIG. 3. In FIG. 4, it can be seen that the trailing shield 312 actually wraps around the sides of the write pole 304, having side portions 404, 406 that are separated from the sides of the write pole 304 by non-magnetic side gap layers 410, 412. For this reason, the shield 312 can be referred to as a wrap-around-trailing magnetic shield 312. The trailing edge of the write pole 304 is separated from the trailing shield 312 by the trailing gap layer 402.

Figure 5:
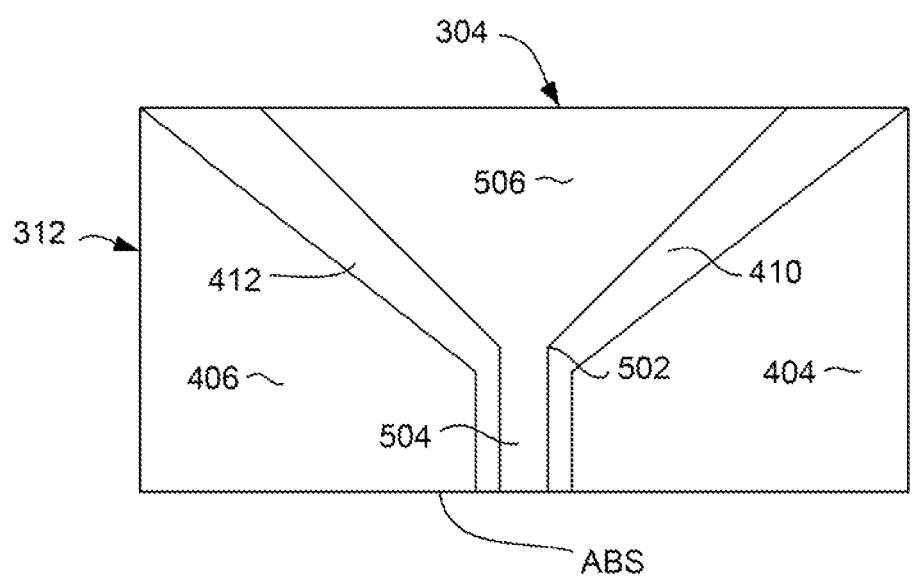
FIG. 5 is a top-down cross sectional view as seen from line 5-5 of FIG. 4.

FIG. 5 shows a top down, cross sectional view as seen from line 5-5 of FIG. 4. A can be seen, the write pole 304 has a flare point 502, which is a point at which the width of the write pole 304 transitions from a constant cross section pole tip portion 504 to a flared portion 506. Also, it can be seen that the non-magnetic side gap layers 410, 412 are tapered so that they become progressively wider with increasing distance from the ABS. More preferably, the side gap layers 410 begin to taper in the region of the flared portion 506 of the write pole 304 and may maintain a substantially constant width in the region of the constant cross section pole tip portion 504 of the write pole 304. The side gap layers 410 can be constructed primarily or entirely of alumina and may actually include more than one layer of alumina. A more detailed structure of the side gap layers 410 will be better understood upon reading the below description of a method for manufacturing a write head according to an embodiment of the invention.

The tapered structure of the side gap layers optimizes performance of the write head by maximizing write field strength while minimizing adjacent track interference. As mentioned above, the performance of the write head involves a balance of competing factors. Adjacent track interference is preferably minimized by minimizing the thickness of the side gaps 410, 412 at the ABS. On the other hand, write field strength must also be maximized. Write field strength can be decreased due to the loss of magnetic write field to the side portions 410, 412 of the shield 312. In order to minimize this loss of write field to the side portions 404, 406, the side gap thickness must be increased. As can be seen in FIG. 5, the tapered side gap layers 410, 412 minimize side gap spacing at the ABS, where the side shielding is needed to prevent adjacent track interference, but increase the side gap spacing away from the ABS to minimize write field loss to the side shield portions 404, 406 in this region. Therefore, it can be seen that the tapered side gap layers 410, 412 provide an optimal balance of minimizing adjacent track interference and maximizing write field strength.

Figure 6:
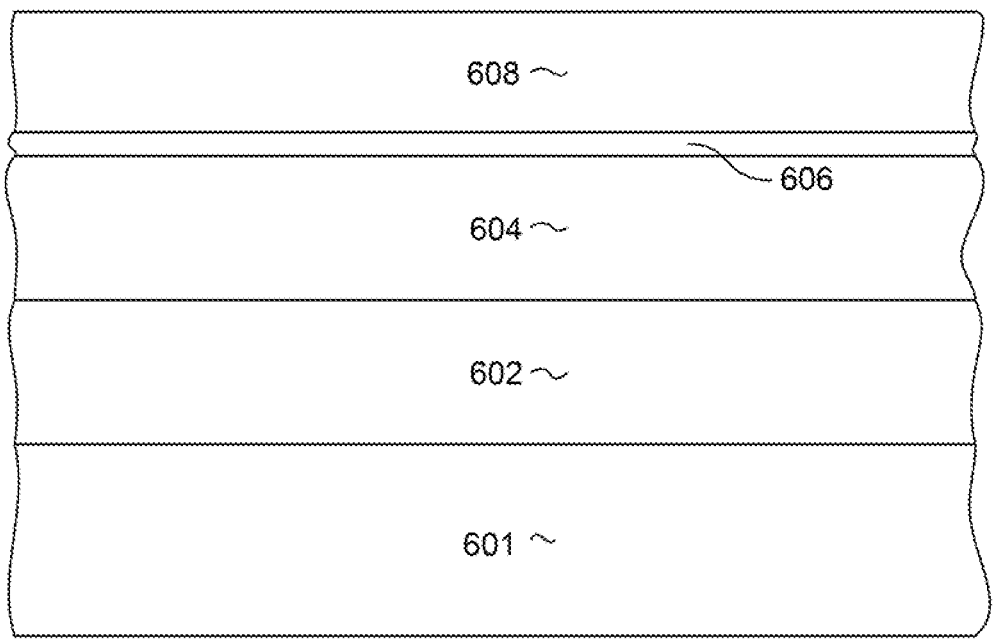
FIGS. 6-29 are views of a write head in various intermediate stages of manufacture illustrating a method for manufacturing a write head according to an embodiment of the invention.

FIGS. 6-29 illustrate a method for manufacturing a magnetic write head according to an embodiment of the invention such as that described above with reference to FIGS. 3-5. With particular reference to FIG. 6, a substrate 601 is provided. This substrate 601 can be include portion of the non-magnetic fill layer 320 and a portion of the shaping layer 310 both of which were described above with reference to FIG. 3. A magnetic write pole material 602 is deposited over the substrate 601, and may actually include layers of high magnetic moment material such as CoFe separated by thin layers of non-magnetic material.

A layer of non-magnetic material that can be removed by reactive ion etching (i.e. RIEable material) 604 is deposited onto the magnetic write pole material 602. This layer 604 can be a material such as SiC and is preferably deposited to a thickness of 180 to 280 nm or about 230 nm. A thinner RIE mask layer 606 is deposited over the layer SiC. This layer 606 can be a material such as Cr and can be deposited to a thickness of 10-30 nm or about 20 nm. Finally, a photoresist layer 608 is deposited over the RIE mask 606.

Figure 7:
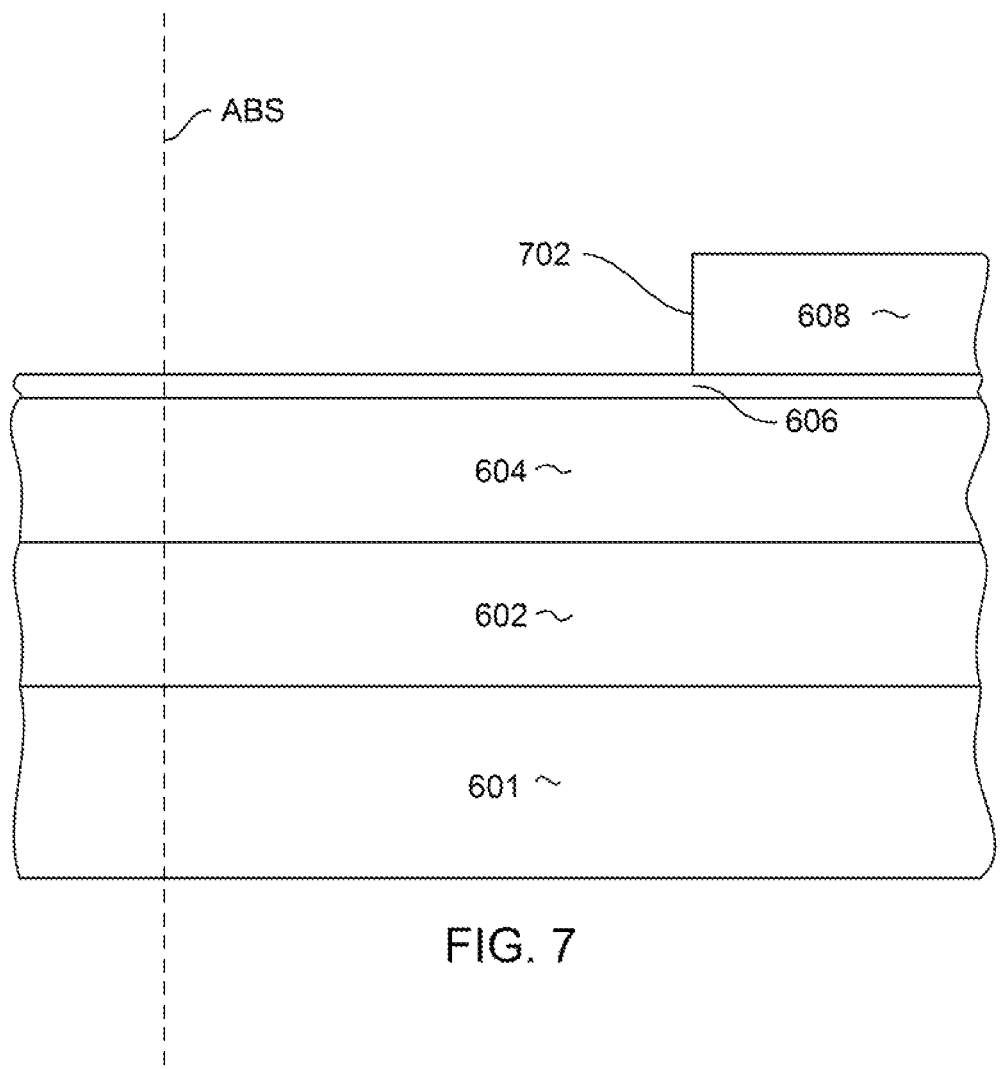
Figure 8:
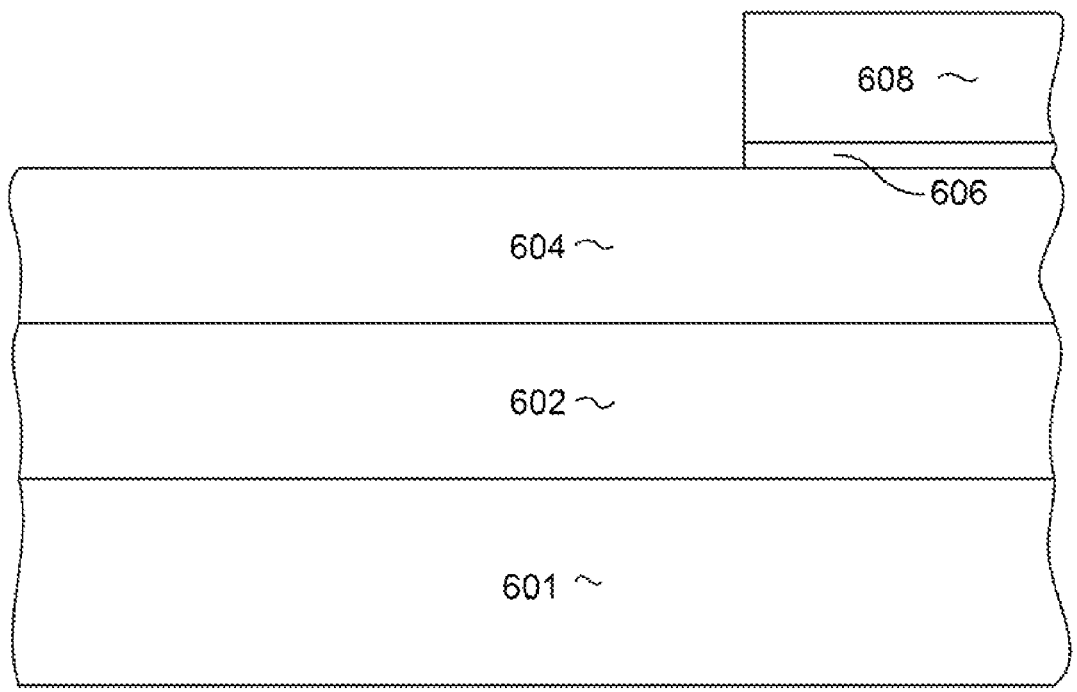
Figure 9:
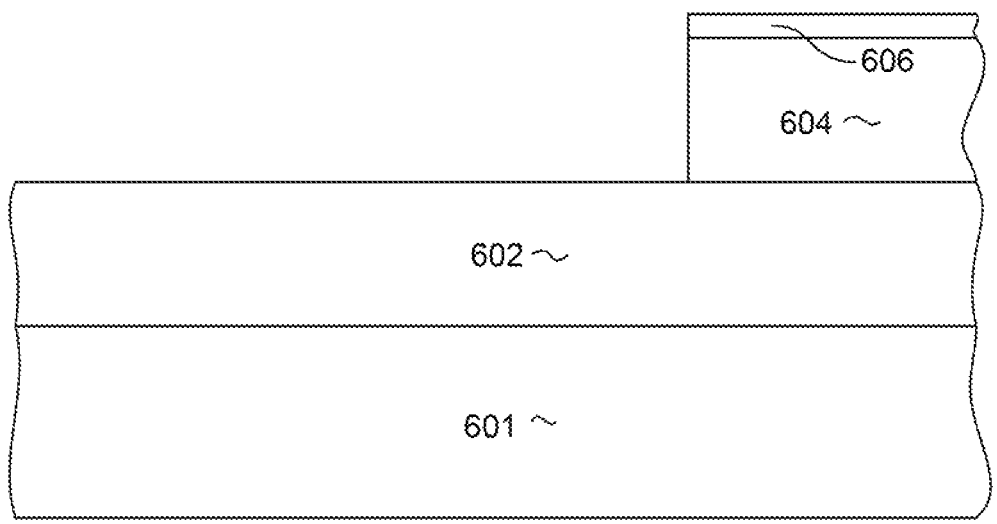

With reference to FIG. 7, the photoresist layer 608 is photolithographically patterned and developed to form a mask having a front edge 702 that is located a desired distance from an intended ABS plane. Then, an ion milling is performed to transfer the image of the photoresist mask 608 onto the underlying RIE mask layer 606, leaving a structure as shown in FIG. 8. A reactive ion etching is then performed to transfer the image of the RIE mask 606 onto the underlying non-magnetic layer 604, leaving a structure as shown in FIG. 9.

Figure 10:
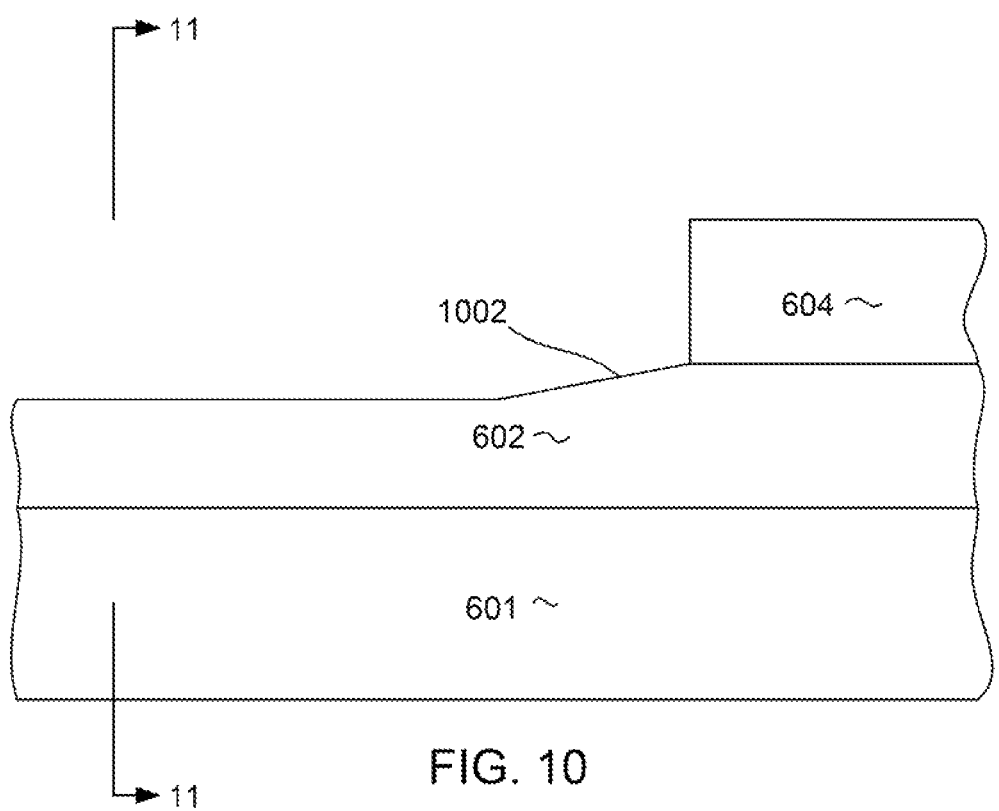

With reference now to FIG. 10, an ion milling process is performed to remove a portion of the magnetic write pole material 602 that is not protected by the non-magnetic material layer 604. The ion milling process is preferably performed at one or more angles relative to normal such that shadowing from the non-magnetic layer 604 causes the ion milling to form a first tapered surface 1002 on the magnetic material layer 602.

Figure 11:
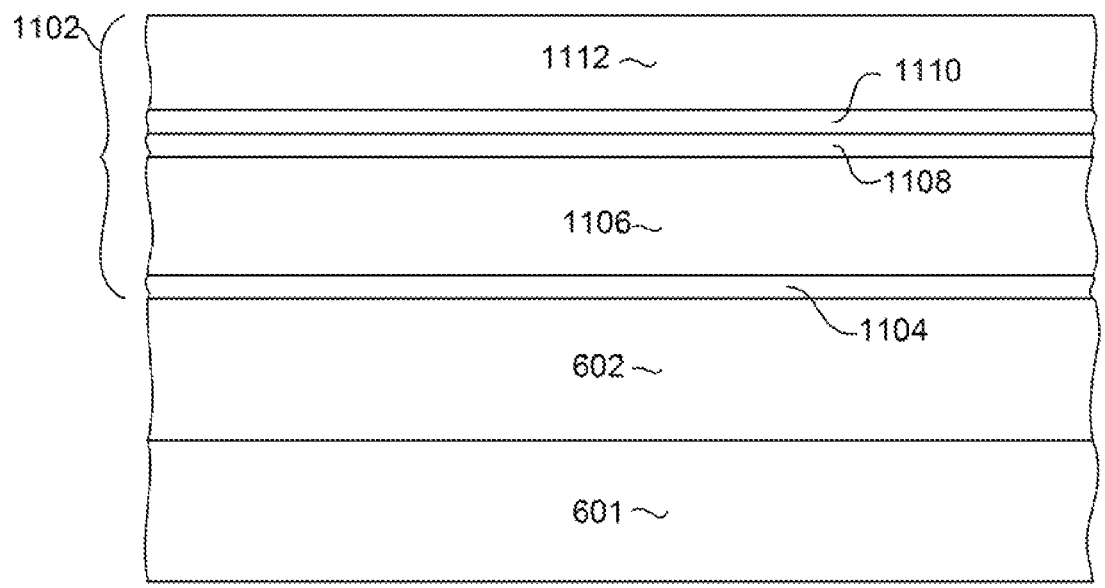

FIG. 11 shows a cross sectional view of a plane parallel with the ABS plane as seen from line 11-11 of FIG. 10. As shown in FIG. 11 a series of mask layers 1102 is deposited. The mask layers 1102 could be of various configurations, the mask layers preferably include a hard mask 1104, image transfer layer 1106, second hard mask 1108, Bottom Antireflective Coating (BARC) 1110 and a photoresist layer 1112. The hard mask can be a material such as alumina, Diamond Like Carbon (DLC) or some other material. The image transfer layer can be a relatively thick layer of a soluble polyimide material such as DURIMIDE®. The second hard mask layer 1108 can be a material such as $SiO_2$. The BARC layer 1110 can be a thin layer of a soluble polyimide such as DURIMIDE®.

Figure 12:
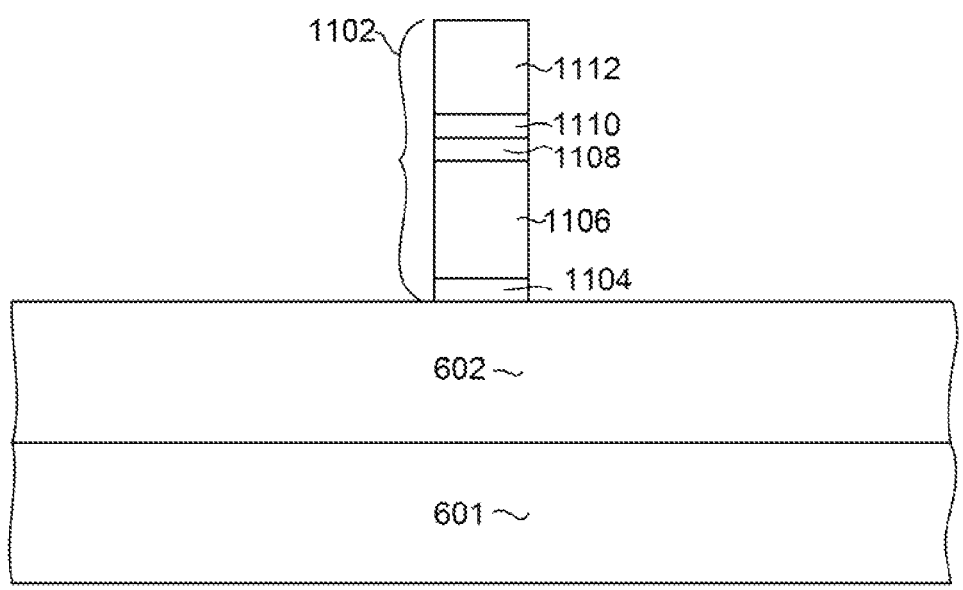
Figure 13:
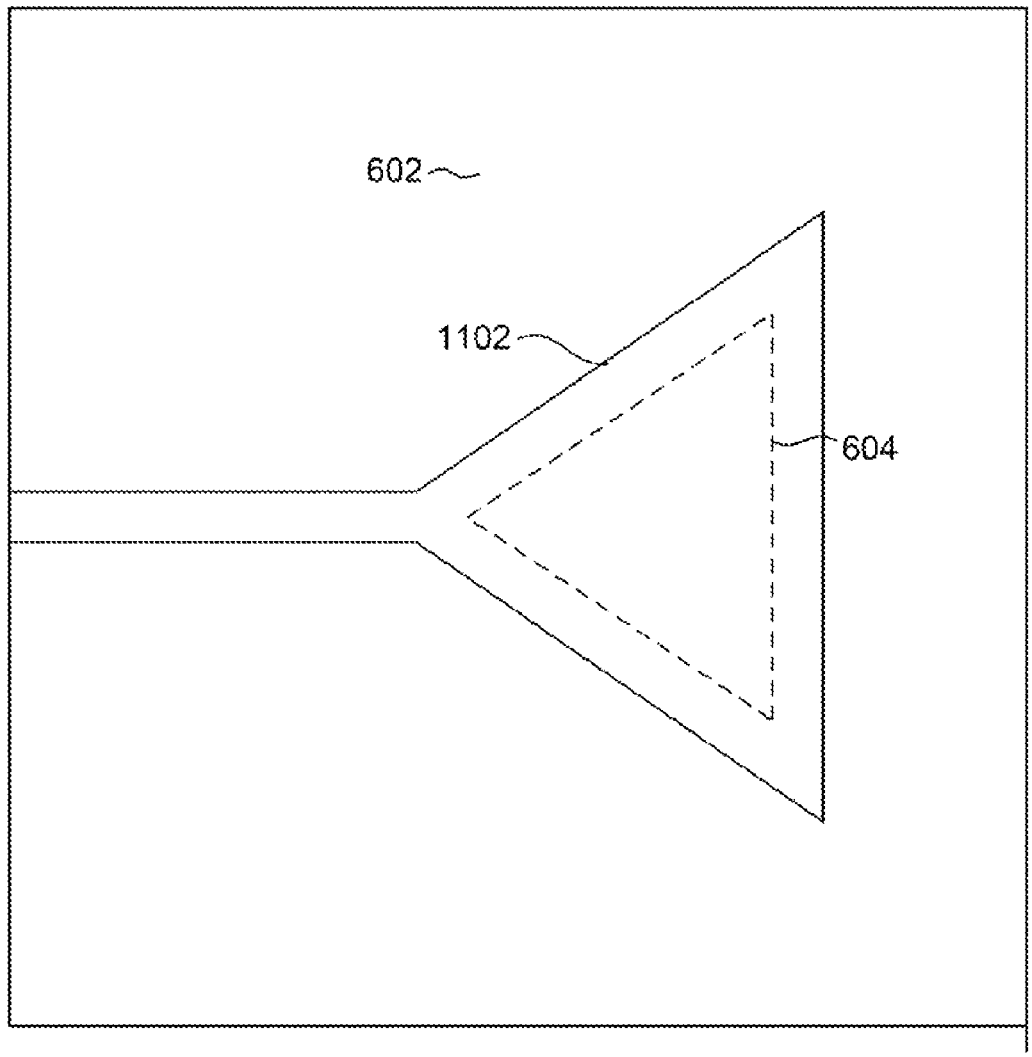

With reference to FIG. 12, the photoresist layer 1112 is photolithographically patterned to a shape that is configured to define a write pole such as the write pole 304 of FIGS. 3-5. The image of the resulting photoresist mask 1112 is then transferred onto the underlying layers 1110, 1108, 1106, 1104 as shown in FIG. 12. This can be accomplished by one or more reactive ion etching and/or ion milling processes. FIG. 12 shows a top down view of the mask 1102, showing its write pole defining shape. In FIG. 13, the non-magnetic step layer 604 that was described above is shown in dashed line to indicate that it is hidden beneath the mask 1102.

Figure 14:
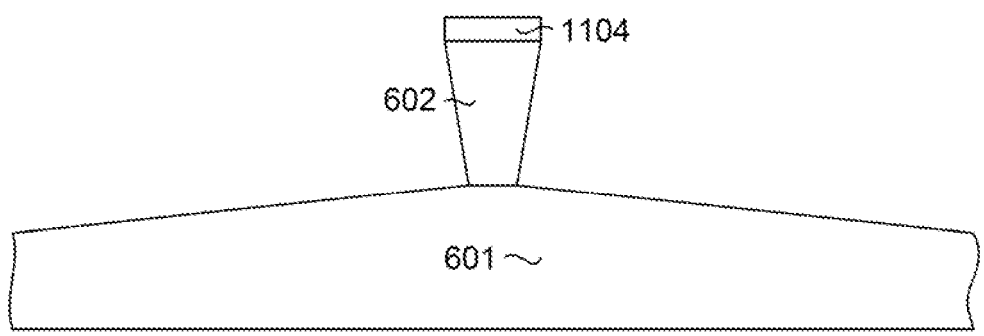

One or more ion milling processes can then be performed to remove portions of the magnetic write pole material 602 that are not protected by the mask 1104. Most of the mask layers 1102 will be consumed by this point, resulting in a structure such as that shown in FIG. 14. The ion milling can be performed at one or more angles relative to normal to form the write pole layer 602 with tapered side walls as shown in FIG. 14.

Figure 15:
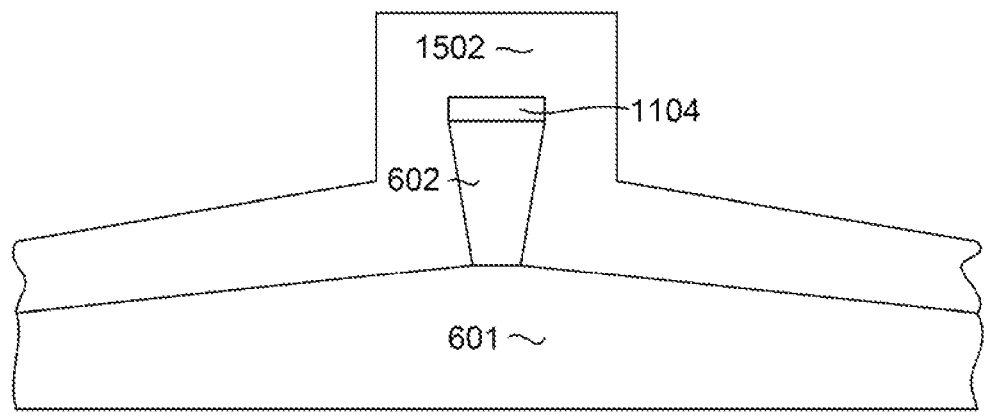

Then, with reference to FIG. 15, a first layer of non-magnetic side gap material 1502 is deposited. This non-magnetic material 1502 is preferably alumina deposited by a conformal deposition process such as atomic layer deposition (ALD) and is preferably deposited to a thickness of 40 to 90 nm.

Figure 16:
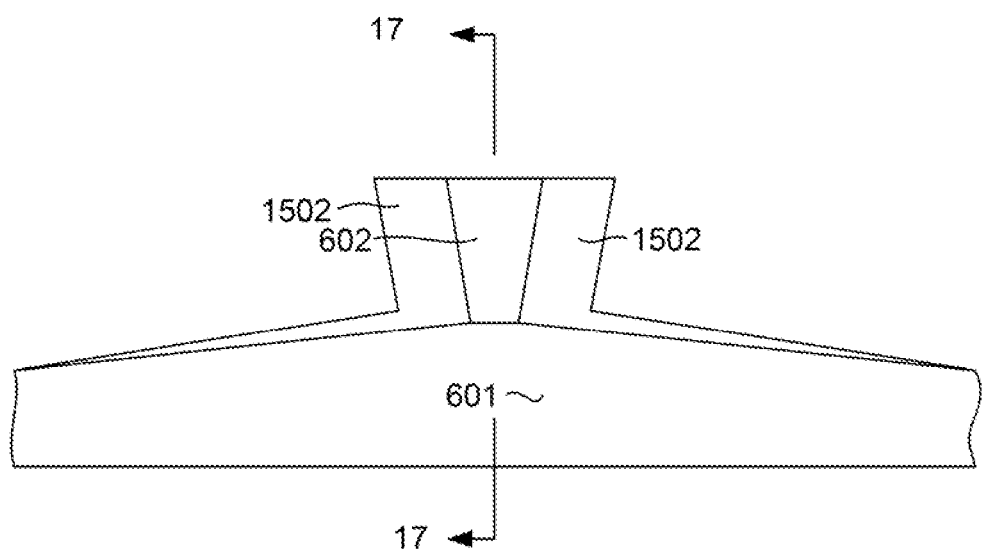
Figure 17:
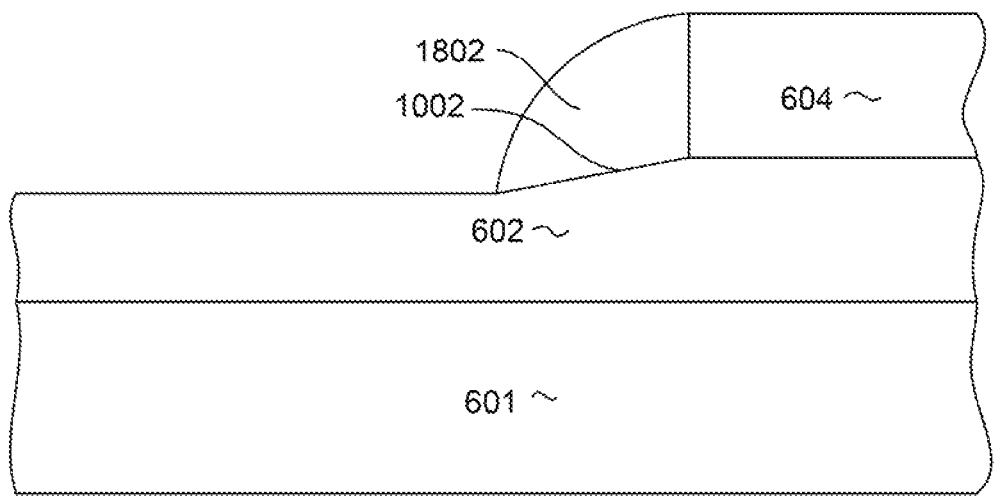

Another ion milling is then performed to preferentially remove horizontally disposed portions of the alumina layer 1502, leaving a structure such as shown in FIG. 16 with first and second non-magnetic side gap walls 1502 formed at either side of the write pole 602. This process also forms a non-magnetic bump 1802 at the front edge of the non-magnetic step layer 604 as shown in FIG. 17. FIG. 17 shows a cross sectional view as taken from line 17-17 of FIG. 16. While the non-magnetic bump 1802 has a unique element number from that of the non-magnetic side walls 1502 of FIG. 16, it should be pointed out that the bump 1802 is formed of the same material and from the same processing steps as the side walls 1502. It can be seen that the non-magnetic bump 1802 extends over the first tapered portion 1002.

Figure 18:
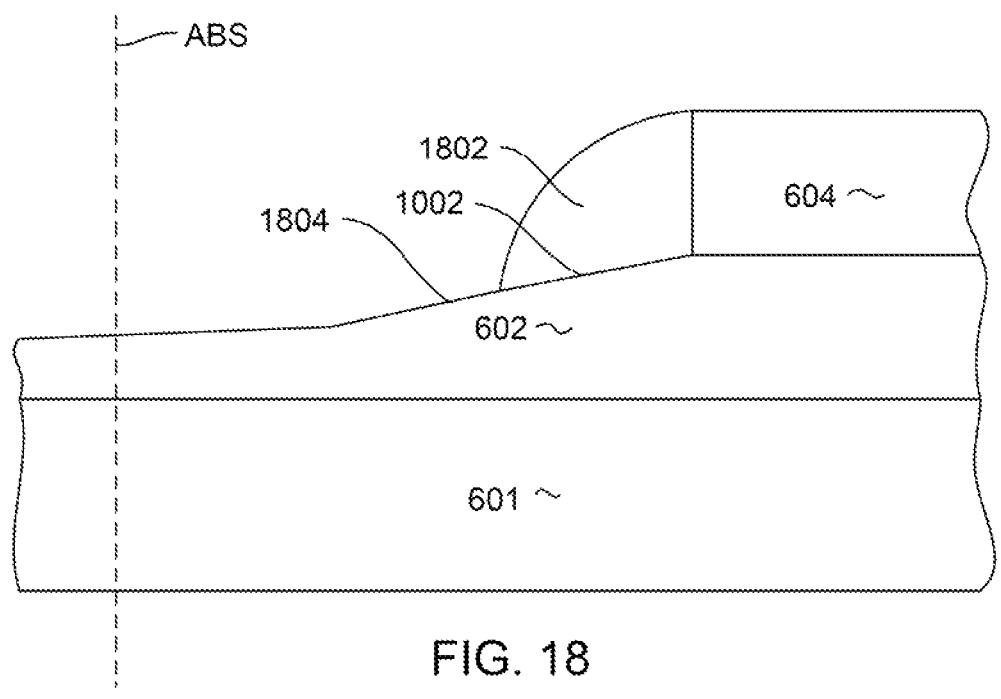
Figure 19:
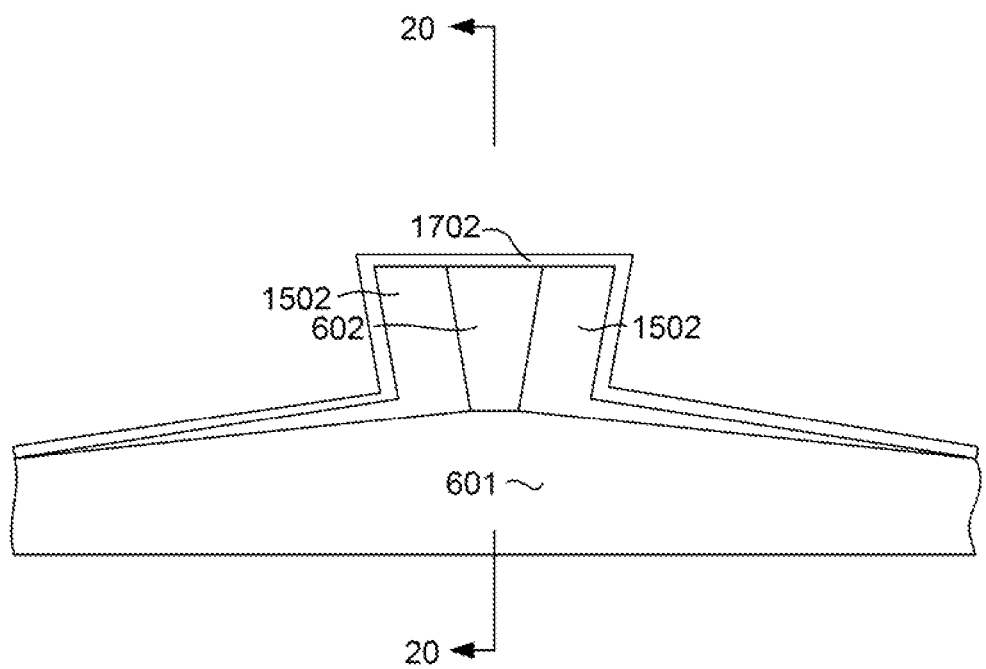
Figure 20:
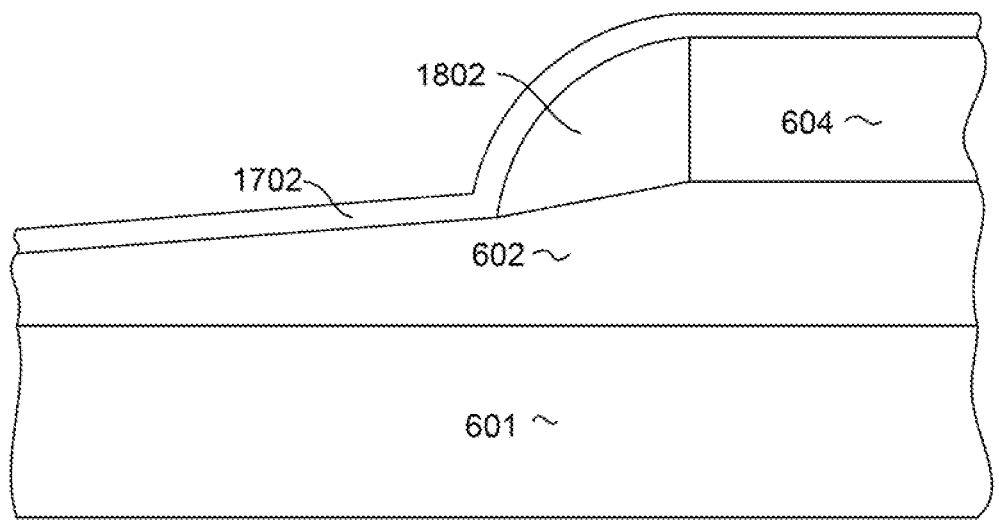

With reference now to FIG. 18 another ion milling process can be performed to form an additional tapered portion 1804 extending from the front edge of the bump 1802 preferably to a point beyond the ABS plane. With reference now to FIG. 1702 non-magnetic trailing gap material layer 1702 is deposited. The non-magnetic gap layer 1702 is preferably deposited to a thickness that is chosen to define a trailing gap such as the gap 402 of FIGS. 3 and 4. The layer 1702 is also preferably resistant to reactive ion etching 1702. The layer 1702 can be a metal such as Ru or Rh deposited by a conformal deposition process and is preferably a layer of Ru deposited by Atomic Vapor Deposition (AVD). FIG. 20 shows a view of the structure with the trailing gap layer 1702 as viewed in cross section from line 20-20 of FIG. 19.

Figure 21:
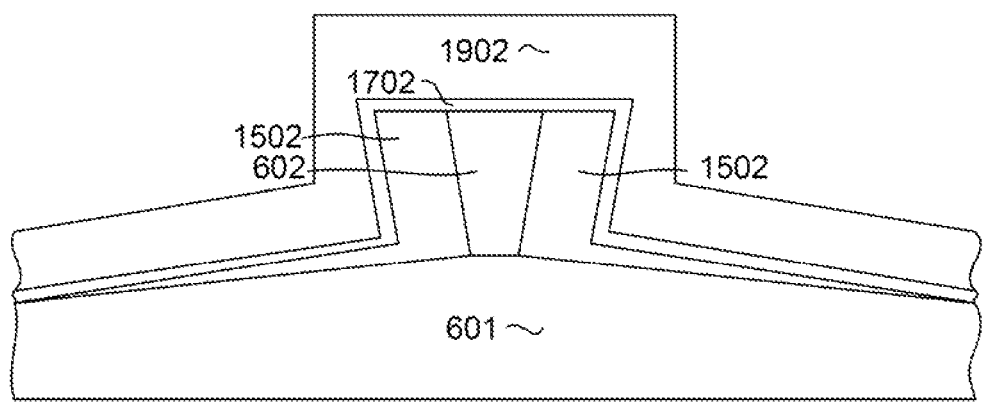
Figure 22:
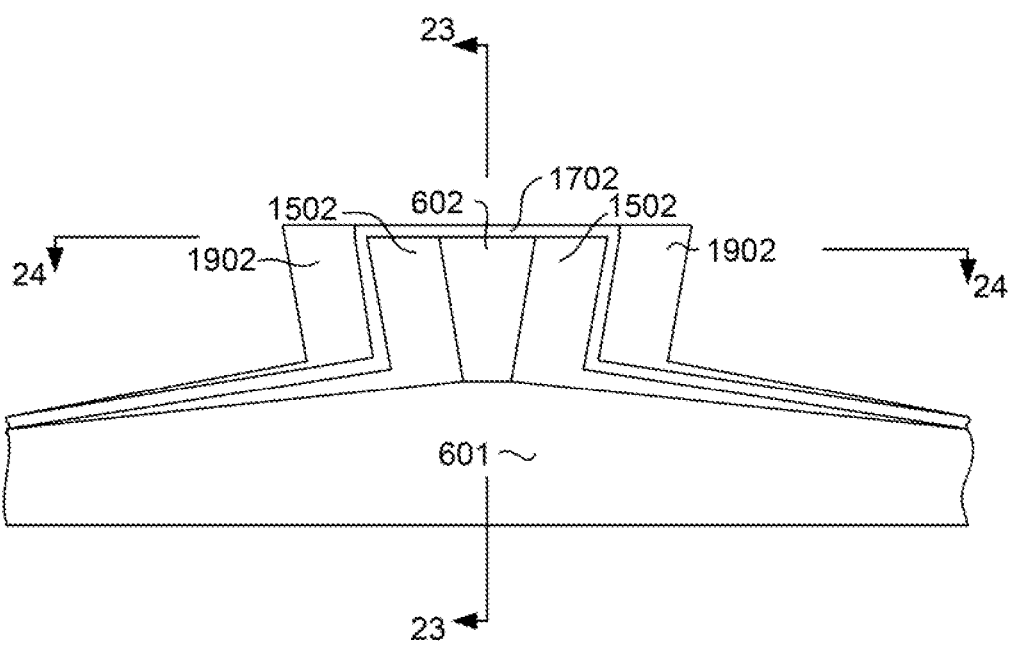
Figure 23:
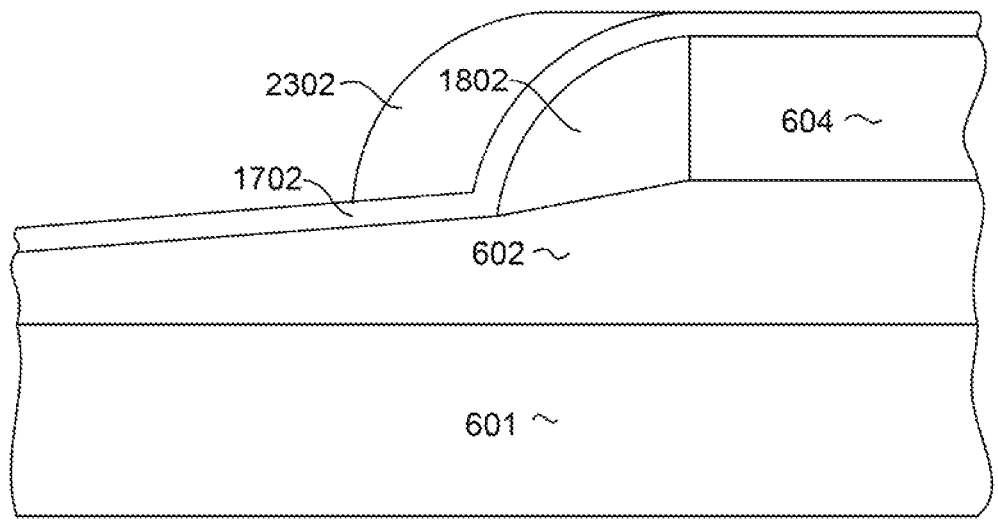
Figure 24:
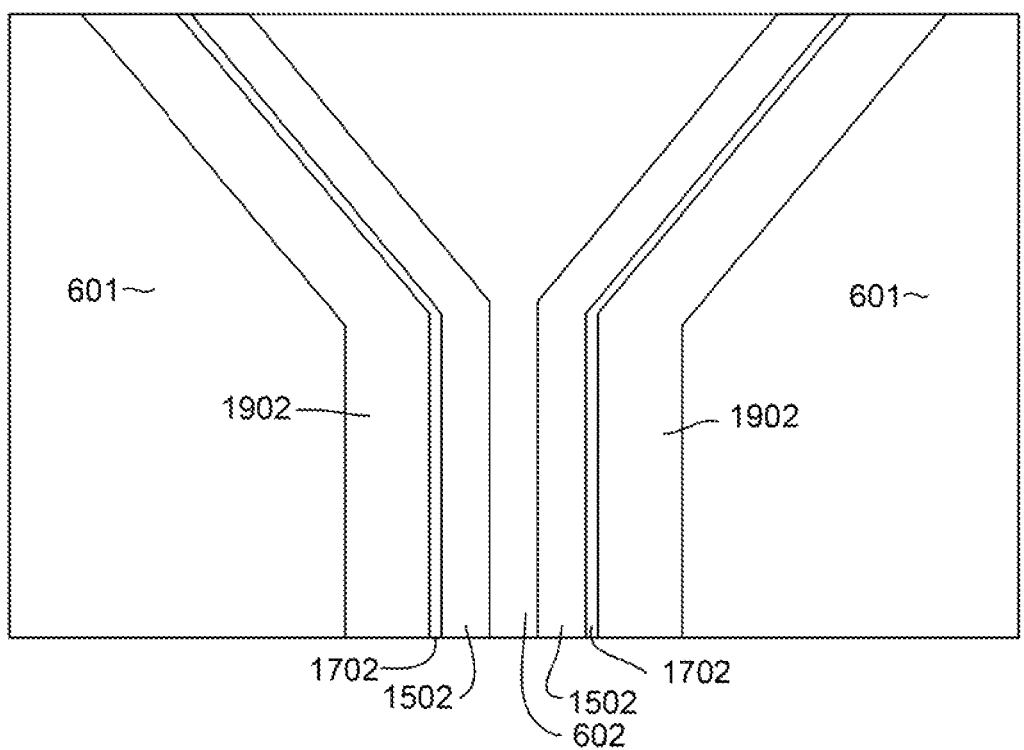
Figure 25:
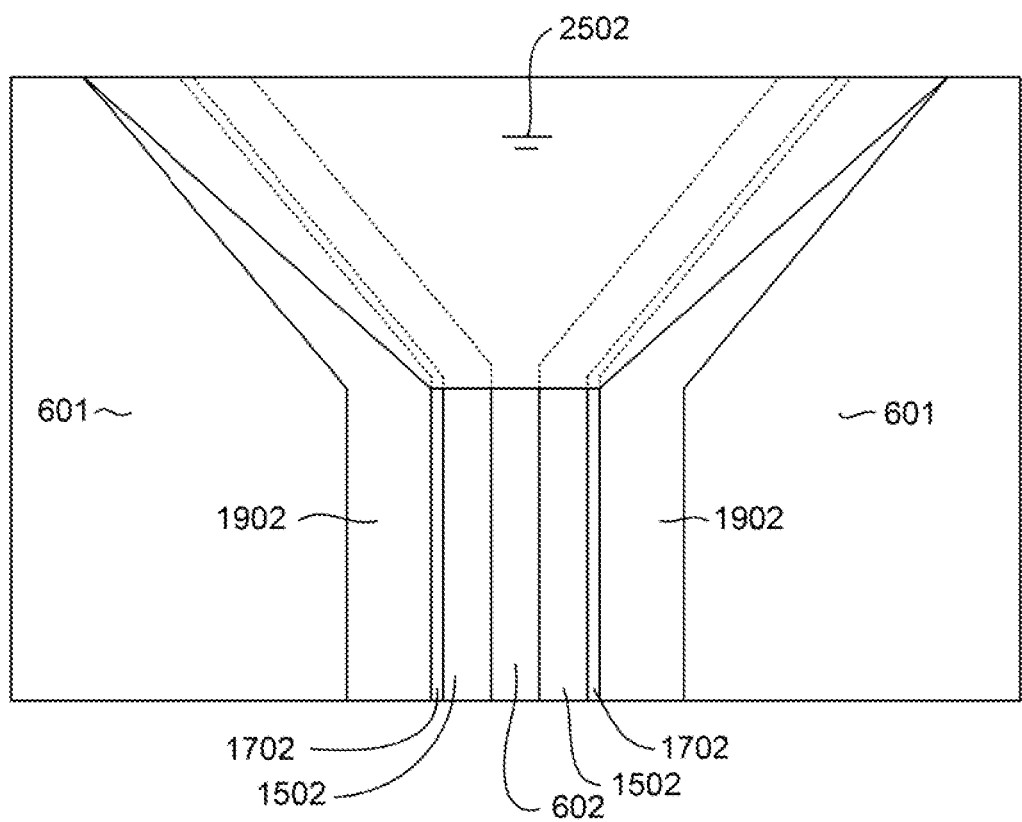
Figure 26:
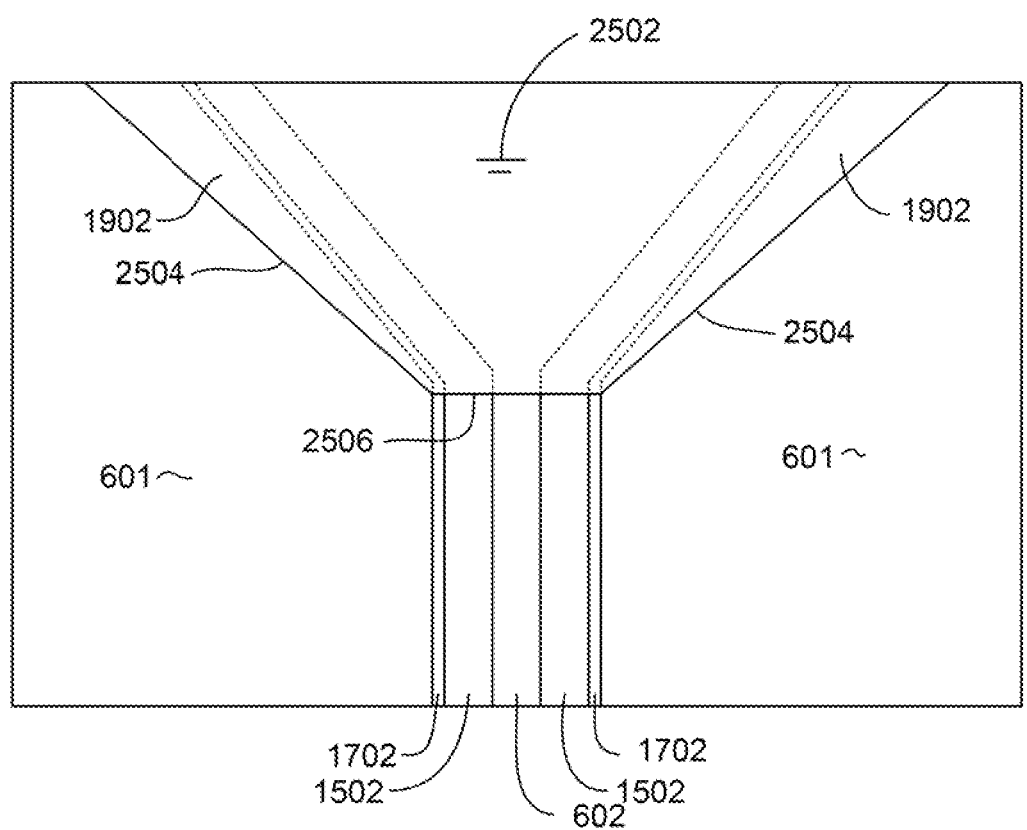
Figure 27:
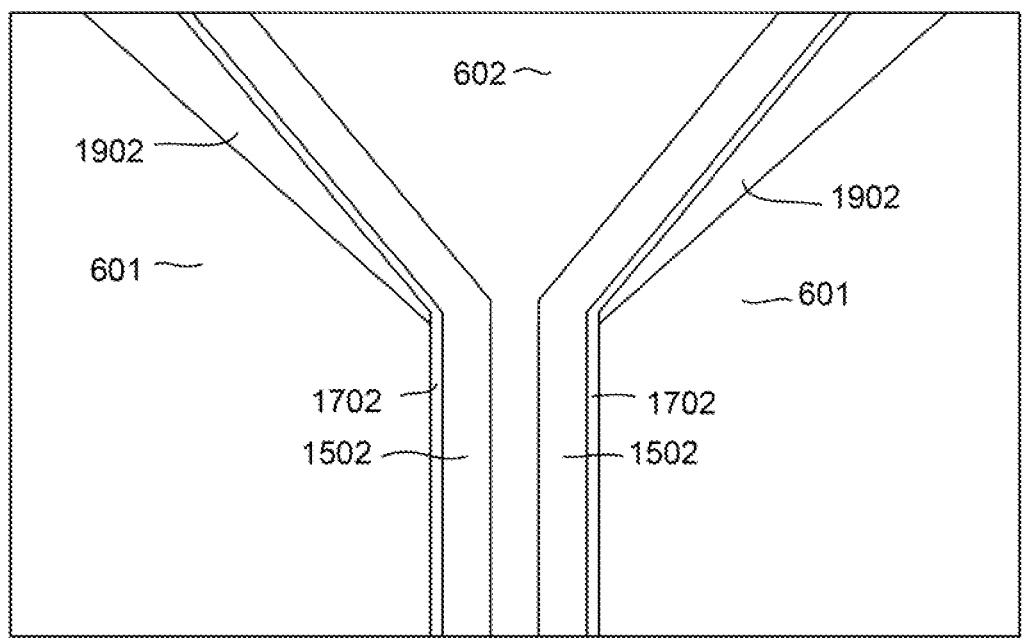

With reference to FIG. 21, another layer of non-magnetic side gap material 1902 is deposited. This layer 1902 is also preferably constructed of alumina, deposited by Atomic Layer Deposition (ALD) and is preferably deposited to a thickness of 100-150 nm. Another ion milling is then performed to remove a portion of the material 1902 and is terminated when the trailing gap layer 1702 has been reached, leaving a structure such as shown in FIG. 22. An end point detection scheme such as Secondary Ion Mass Spectrometry can be used to determine when the layer 1702 has been reached. FIG. 23 shows a cross sectional view as seen from line 23-23 of FIG. 20, and as can be seen in FIG. 23, the deposition of layer 1902 and subsequent ion milling forms a second non-magnetic bump 2302 in front of the first bump 1802. Again, this bump 2302 is formed of the same material and by the same process as the side gap layers 1902 shown in FIG. 22. FIG. 24 shows a top-down cross sectional view as seen from line 24-24 of FIG. 22, and as can be seen, the above process forms inner non-magnetic side gaps 1502 and outer non-magnetic side gaps 1902, the inner and outer side gaps being separated from one another by the metal layer 1702. With reference now to FIG. 25, a side taper defining mask 2502 is formed over the write pole 602 and side gap layers 1502, 1902 as shown. As can be seen, the mask 2502 has taper defining outer edges 2504 that expose varying amounts of the outer side gap layer 1902. The front of the outer edge 2504 exposes most or all of the side gap layer 1902 whereas at the back, the outer edge covers most or all of the side gap layer 1902. The mask 2502 may also have a front edge 2506 that terminates near or slightly in front of the flare point of the write pole 602. A reactive ion etching can then be performed to remove portions of the outer side gap layer 1902 that are not protected by the mask 2502, leaving a structure such as that shown in FIG. 26. The mask 2502 can then be removed leaving a structure as shown in FIG. 27.

Figure 28:
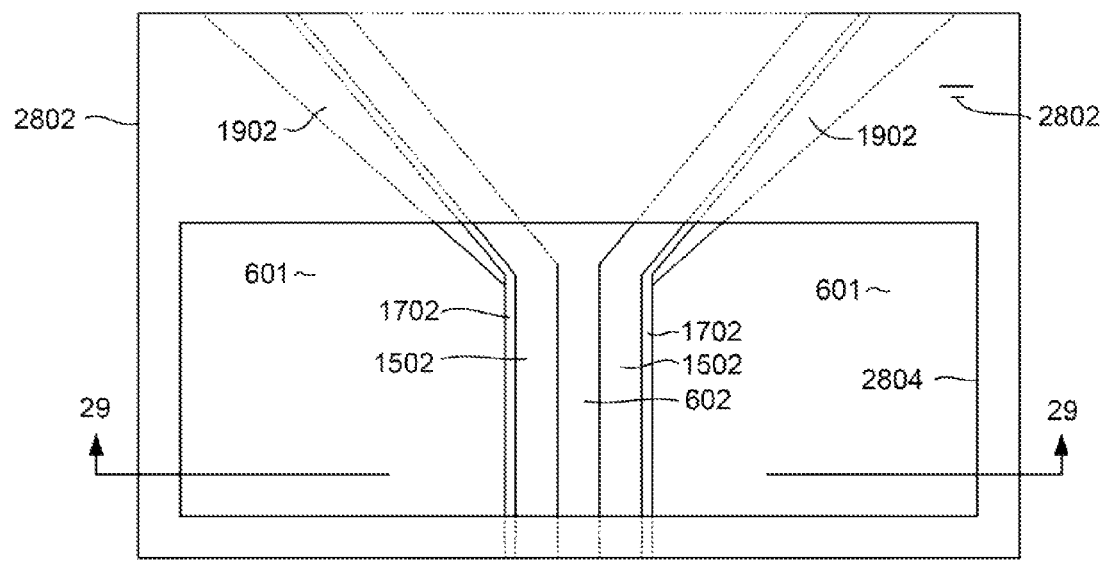
Figure 29:
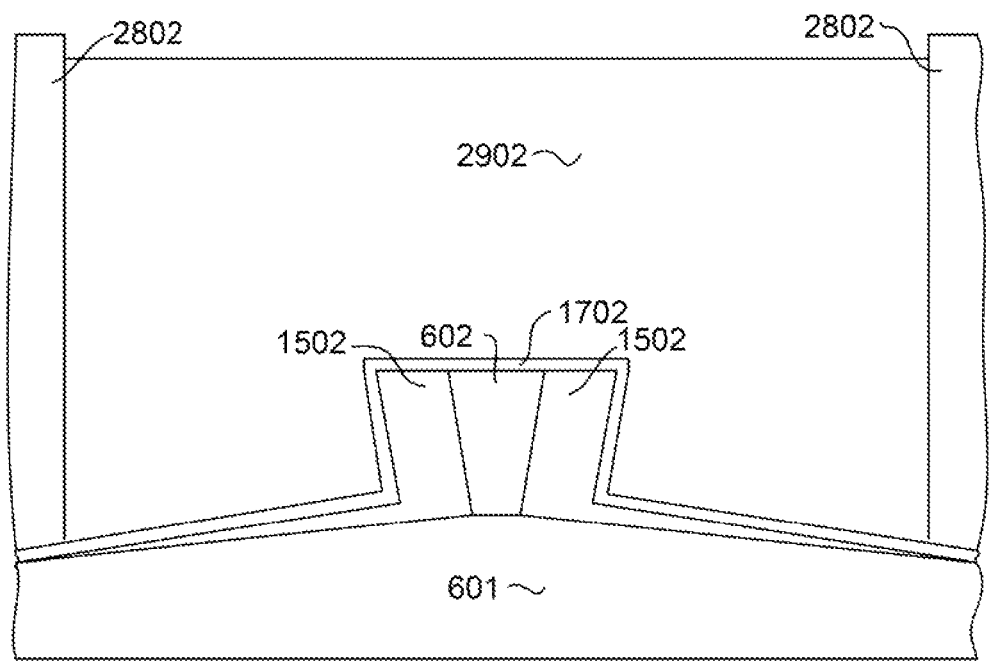

With reference now to FIG. 28, an electroplating frame mask 2802 is formed such as from photolithographically patterned photoresist. The mask 2802 is formed with an opening 2804 that is configured to define a shape of a trailing, wrap around magnetic shield. With reference to FIG. 29, which shows a cross sectional view as seen from line 29-29 of FIG. 28, a magnetic material can be electroplated into the opening in the mask 2802 to form a wrap-around-trailing magnetic shield. The mask 2802 can then be lifted off.

It should be pointed out, that while the above structure and method have described the construction of a write pole with a non-magnetic step layer 604, non-magnetic bumps 1802, 2302 and tapers 1002, 1702, these are optional and are not critical to the formation of a write head with tapered non-magnetic side gaps.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
a magnetic write pole having a pole tip terminating at an air bearing surface, first and second laterally opposed sides and a trailing edge extending from the first side to the second side;
a wrap-around-trailing magnetic shield having first and second side shield portions; and
first and second non-magnetic side gap layers separating the first and second side portions of the wrap-around-trailing magnetic shield from the first and second sides of the write pole, each of the first and second non-magnetic side gap layers having a thickness that increases with increasing distance from the air bearing surface;
wherein each of the non-magnetic side gap layers comprises an inner layer of non-magnetic material having a substantially constant thickness and an outer layer of non-magnetic material having a varying thickness.

2. A magnetic write head, comprising:
a magnetic write pole having a pole tip terminating at an air bearing surface, first and second laterally opposed sides and a trailing edge extending from the first side to the second side;
a wrap-around-trailing magnetic shield having first and second side shield portions; and
first and second non-magnetic side gap layers separating the first and second side portions of the wrap-around-trailing magnetic shield from the first and second sides of the write pole, each of the first and second non-magnetic side gap layers having a thickness that increases with increasing distance from the air bearing surface;
wherein each of the non-magnetic side gap layers comprises an inner layer of alumina having a substantially constant thickness and an outer layer of alumina having a varying thickness.

3. A magnetic write head, comprising:
a magnetic write pole having a pole tip terminating at an air bearing surface, first and second laterally opposed sides and a trailing edge extending from the first side to the second side;
a wrap-around-trailing magnetic shield having first and second side shield portions; and
first and second non-magnetic side gap layers separating the first and second side portions of the wrap-aroundtrailing magnetic shield from the first and second sides of the write pole, each of the first and second non-magnetic side gap layers having a thickness that increases with increasing distance from the air bearing surface;

wherein each of the non-magnetic side gap layers comprises an inner layer of alumina having a substantially constant thickness, an outer layer of alumina having a varying thickness that increases with increasing distance from the air bearing surface, and a layer of non-magnetic metal sandwiched between the inner and outer layers of alumina.

4. The write head as in claim 3 wherein the non-magnetic metal comprises Ru.

5. The write head as in claim 3 wherein the non-magnetic metal comprises Rh.

6. The write head as in claim 3 wherein the non-magnetic metal comprises Ru or Rh and wherein the non-magnetic metal extends over the trailing edge of the write pole to provide a non-magnetic trailing gap between the wrap-around trailing magnetic shield and the trailing edge of the write pole.

* * * * *

UNITED STATES PATENT AND TRADEMARK OFFICE
CERTIFICATE OF CORRECTION

| | | |
|---|---|---|
| PATENT NO. | : 8,451,562 B2 | Page 1 of 1 |
| APPLICATION NO. | : 12/766769 | |
| DATED | : May 28, 2013 | |
| INVENTOR(S) | : Aron Pentek et al. | |

It is certified that error appears in the above-identified patent and that said Letters Patent is hereby corrected as shown below:

In the Specification:

Column 5, line 1 replace "the hack portion" with --the back portion--.

Signed and Sealed this
Seventh Day of July, 2015

Michelle K. Lee
*Director of the United States Patent and Trademark Office*